United States Patent
Carmichael et al.

(10) Patent No.: US 8,710,128 B2
(45) Date of Patent: Apr. 29, 2014

(54) METHOD OF REDUCING ACETALDEHYDE IN POLYESTERS, AND POLYESTERS THEREFROM

(75) Inventors: Adrian John Carmichael, Liverpool (GB); Carolyn Diana Adamson, Le Willows (GB); Philip Brannon, Wirral (GB)

(73) Assignee: Colormatrix Holdings, Inc., Wilmington, DE (US)

( * ) Notice: Subject to any disclaimer, the term of this patent is extended or adjusted under 35 U.S.C. 154(b) by 90 days.

(21) Appl. No.: 13/201,315

(22) PCT Filed: Feb. 12, 2010

(86) PCT No.: PCT/GB2010/050227
§ 371 (c)(1),
(2), (4) Date: Aug. 12, 2011

(87) PCT Pub. No.: WO2010/094947
PCT Pub. Date: Aug. 26, 2010

(65) Prior Publication Data
US 2011/0291322 A1    Dec. 1, 2011

(30) Foreign Application Priority Data
Feb. 20, 2009  (GB) .................................. 0902941.4

(51) Int. Cl.
*C08K 5/523*    (2006.01)

(52) U.S. Cl.
USPC .......................................... 524/127; 524/417

(58) Field of Classification Search
USPC .................................................... 524/127, 417
See application file for complete search history.

(56) References Cited

U.S. PATENT DOCUMENTS

| | | |
|---|---|---|
| 2004/0106767 A1 | 6/2004 | Simon et al. |
| 2005/0203267 A1 * | 9/2005 | Jernigan et al. ............... 528/271 |
| 2007/0066791 A1 | 3/2007 | Jernigan et al. |
| 2008/0241450 A1 | 10/2008 | Zeng et al. |

FOREIGN PATENT DOCUMENTS

| | | |
|---|---|---|
| EP | 1 013 692 | 6/2000 |
| WO | WO 00/66659 | 11/2000 |
| WO | WO 2005/040261 | 5/2005 |
| Wo | WO 2007/039719 | * 4/2007 |

* cited by examiner

*Primary Examiner* — Peter Szekely
(74) *Attorney, Agent, or Firm* — Fay Sharpe LLP

(57) ABSTRACT

Acetaldehyde production in a polyester may be reduced by using a formulation which comprises an acetaldehyde scavenger and a phosphorous additive. The two materials appear to act synergistically in reducing acetaldehyde production. Preferred formulations comprise anthranilamide and phosphorous acid and are used in combination with aluminium or titanium catalysed PET resins.

22 Claims, No Drawings

METHOD OF REDUCING ACETALDEHYDE IN POLYESTERS, AND POLYESTERS THEREFROM

This inventions relates to polyesters and particularly, although not exclusively, relates to polyethylene terephthalate and additives therefor.

Polyethylene terephthalate (PET) is used on a large scale for the manufacture of food packages such as bottles. Such bottles are widely utilised for packaging of beverages, such as carbonated soft drinks, beer, or mineral water. The technique commonly used to manufacture bottles from PET (ie. to convert the PET into a predetermined shape from a raw material stage) generally involves a two stage process. In the first stage granules of the PET are injection moulded to make a preform. In the second stage the preform is blow moulded to the desired shape.

The softening point of PET is high. Thus a typical temperature needed for processing of PET is in the region of 260° C. to 285° C. A recognised problem in the industry is that, under the high temperatures and shear conditions needed for injection moulding to make a preform and for blow moulding of the preform to make a bottle, PET tends to degrade, resulting in the formation of acetaldehyde. The presence of acetaldehyde in the material of the finished bottle is undesirable, particularly when the bottle is to be used for products for human consumption, because the acetaldehyde can migrate from the walls of the package or bottle into its contents, whereupon it adversely affects the flavour and fragrance properties of the comestible product. Although the migration of acetaldehyde from a PET bottle into a carbonated drink is undesirable, a trace of acetaldehyde can often be tolerated because the taste and fragrance of the drink are not usually noticeably affected. However, the presence of even minute amounts of acetaldehyde in a non-carbonated drink, such as still mineral water, tends to impart a most undesirable adverse taste and odour to the drink.

PET is typically manufactured by the polycondensation reaction of terephthalic acid and ethylene glycol as the two major constituents. The reaction is carried out in two stages; the first stage is esterification of terephthalic acid in the presence of an excess of ethylene glycol. This reaction is carried out at elevated temperature (200-280° C.) under reduced pressure to give a glycol ester as an intermediate and water as a by-product. The second stage is polycondensation of the glycol ester intermediate, again at reduced pressure and at a temperature typically of 290° C. In most cases a metal catalyst, for example an oxide, acetate or alkoxide is added to promote the reaction. The excess glycol released during this process is distilled off and reused. The viscous polymer mass is then extruded into strands, quenched with water and pelletized. As well as being produced from terephthalic acid and ethylene glycol, PET can be produced by transesterification of dimethyl tereptalate and ethylene glycol, and comonomers can be added to alter the properties of the final product.

As a conventional polyester polymerization catalyst used in polycondensation of polyester, antimony trioxide has been used widely. Antimony trioxide is an inexpensive and highly active catalyst, but when antimony trioxide is used as a major component, that is, when it is used in such an amount as to exhibit a practical rate of polymerization, an antimony metal is precipitated and this causes problems such as grey discoloration or generation of insoluble particles in polyester. For this reason, polyester absolutely free of antimony or excluding antimony as a major catalytic component is desired.

As a result of the problems associated with the use of antimony based catalysts and also environmental concerns, other catalysts systems are being developed for use in manufacturing PET. For example, US2003/0045673 (the content of which is incorporated herein by reference) discloses a polyester polymerisation catalyst which excludes an antimony compound or germanium compound as a major catalytic component, and instead the document describes a polyester polymerization catalyst which includes aluminium and compounds thereof.

Other more recent catalyst systems are based on titanium such as described in US2005/0153086.

Notwithstanding the move towards non-antimony based catalysts such as aluminium or titanium based catalysts, the problem of acetaldehyde production during processing still represents a significant problem. Whilst this problem can be addressed by use of known acetaldehyde scavengers, it is desirable to minimize the levels of any additives added to PET since additives, particularly high levels of additives, can affect optical properties of the PET, for example, haze, clarity and colour, and impact the recyclability of PET articles.

It is an object of the present invention to address the above described problems.

According to a first aspect of the invention, there is provided a method of reducing acetaldehyde production in a polyester, the method comprising:

(a) selecting an acetaldehyde scavenger;
(b) selecting a phosphorus additive, being an additive comprising a phosphorus moiety; and
(c) contacting the polyester with said acetaldehyde scavenger and with said phosphorus additive.

Surprisingly, it has been found that the phosphorus additive and acetaldehyde scavenger are an effective combination, with the acetaldehyde reducing ability of the combination being greater than that of the individual components and/or that, in using the combination, the total amount of additive used to reduce acetaldehyde levels may be reduced, thereby reducing detrimental effects on optical properties of the polyester.

A reference herein to "ppm" refers to "parts per million" by weight.

Methods for measurement of acetaldehyde in industrially injection-moulded polyethylene terephthalate preforms have been described by FI Villian et al., Journal of Polymer Science, Vol. 52, 55-60 (1994).

Step (c) may be carried out with the polyester in a molten state. Preferably, said acetaldehyde scavenger and said phosphorus additive are added to solid polyester, suitably at a temperature below the melting point of the polyester so the polyester is not in a fluid and/or molten state.

Prior to step (c), said polyester is preferably selected, suitably when in a solid state as aforesaid. Said selected polyester is suitably present substantially in the absence of monomers used in preparation of the polyester. Said selected polyester is preferably in a state in which it is isolated from a reaction mixture in which it may have been formed. It is preferably an isolated polyester. The method may include the step of drying the polyester prior to step (c). Said selected polyester is preferably in a particulate form, for example in the form of pellets or granules.

In step (c), polyester may be contacted with at least 5 ppm, suitably at least 10 ppm, preferably at least 20 ppm, more preferably at least 35 ppm, especially at least 50 ppm of acetaldehyde scavenger per part of polyester. The level of scavenger contacted with polyester may be less than 1000 ppm, suitably less than 600 ppm, preferably less than 400 ppm, more preferably less than 300 ppm per part of polyester.

In step (c), polyester may be contacted with at least 15 ppm, more preferably at least 20 ppm, especially at least 25 ppm of phosphorus additive per part of polyester. The level of phosphorus additive may be less than 500 ppm, suitably less than 250 ppm, preferably less than 200 ppm, more preferably less than 150 ppm, especially less than 100 ppm.

The ratio of the ppm of a said selected acetaldehyde scavenger to the ppm of a said selected phosphorus additive may be in the range 0.5 to 25, is suitably in the range 0.5 to 10, is preferably in the range 1 to 5, is more preferably in the range 1.5 to 5, and is especially in the range 1.5 to 3.

When the acetaldehyde scavenger is a polymer (e.g. as described in U.S. Pat. No. 5,340,884) higher ppm addition rates (eg up to 10000 ppm or even up to 20,000 ppm) may be needed to give the desired acetaldehyde reduction. In this case, the ratio of the ppm of a said selected acetaldehyde scavenger to the ppm of a said selected phosphorus additive may be in the range 1 to 5000, is suitably in the range 50 to 1000, is preferably in the range 100 to 750 and is more preferably in the range 200 to 500.

Where the method utilises more than one type of phosphorus additive, each additive may be present at the levels described above. Preferably, however, the sum of the amount of phosphorus additives is within the ranges stated for said additive described above. Preferably, the method utilises only a single type of phosphorus additive.

Where the method utilises more than one type of acetaldehyde scavenger, each scavenger may be present at the levels described above. Preferably, however, the sum of the amount of acetaldehyde scavenger is within the ranges stated for said additive described above. Preferably, the method utilises only a single type of acetaldehyde scavenger.

The ratio of the sum of the ppm of all acetaldehyde scavengers added in step (c) to the ratio of the sum of the ppm of all phosphorus additives added in step (c) may be in the range 0.5 to 25, is suitably in the range 0.5 to 10, is preferably in the range 1 to 5, is more preferably in the range 1.5 to 5, and is especially in the range 1.5 to 3.

A mixture comprising said acetaldehyde scavenger and said phosphorus additive is preferably selected prior to step (c) and the mixture is suitably contacted with the polyester in step (c).

Said mixture preferably includes a polyester compatible organic liquid carrier. Such a carrier must be compatible with the polyester and with the other components. Typical carriers include hydrocarbons, hydrocarbon mixtures, alcohols, esters, polyethers and mixtures of two or more thereof.

Preferably the polyester-compatible organic liquid carrier is an oil-based vehicle. Examples of such vehicles are the materials sold as Clearslip™ 2 and Clearslip™ 3 by Color-Matrix Europe Ltd, of Units 9-11 Unity Grove, Knowsley Business Park, Merseyside, L34 9GT.

The sum of the wt % of acetaldehyde scavenger(s) and phosphorus additive(s) in said mixture may be less than 60% wt %, preferably less than 50 wt %. Said sum may be in the range 10-50 wt %.

Preferred acetaldehyde scavengers include one or more nitrogen atoms. Preferably, the nitrogen atoms are not bonded to other atoms by double or triple bonds, but are preferably bonded to three other atoms by single bonds. Preferred scavengers include amine moieties. Preferred amine moieties are primary and secondary amine moieties. Especially preferred are scavengers which include a —$NH_2$ moiety.

In one embodiment, preferred acetaldehyde scavengers include both amine moieties as described and amide moieties. In one embodiment, preferred acetaldehyde scavengers include a substituted phenyl moiety. In one preferred embodiment, a said acetaldehyde scavenger may include an amine moiety (especially —$NH_2$), an amide moiety (especially —$CONH_2$) and a substituted phenyl moiety. In this case, it is preferred that both the amine moiety and the amide moiety are directly bonded to the phenyl moiety. Preferably, the amine moiety and amide moiety are bonded ortho to one another.

One class of acetaldehyde scavengers may be as described in U.S. Pat. No. 5,340,884 (Eastman), the content of which as regards the scavengers is incorporated herein by reference. In this case, the scavenger may be a polyamide selected from the group consisting of low molecular weight partially aromatic polyamides having a number average molecular weight of less than 15,000, low molecular weight aliphatic polyamides having a number average molecular weight of less than 7,000, and combinations thereof. Preferred low molecular weight partially aromatic polyamides include: poly(m-xylylene adipamide), poly(hexamethylene isophthalamide), poly(hexamethylene adipamide-co-isophthalamide), poly(hexamethylene adipamide-co-terephthalamide), and poly(hexamethylene isophthalamide-co-terephthalamide). The most preferred low molecular weight partially aromatic polyamide is poly(m-xylylene adipamide) having a number average molecular weight of 4,000 to 7,000 and an inherent viscosity of 0.3 to 0.6 dL/g. Preferred low molecular weight aliphatic polyamides include poly(hexamethylene adipamide) and poly(caprolactam). The most preferred low molecular weight aliphatic polyamide is poly(hexamethylene adipamide) having a number average molecular weight of 3,000 to 6,000 and an inherent viscosity of 0.4 to 0.9 dL/g.

Another class of acetaldehyde scavengers may be as described in U.S. Pat. No. 6,762,275 (Coca-Cola), the content of which as regards the scavenger is incorporated herein by reference. In this case, the scavenger may include at least two component molecular fragments, each component molecular fragment comprising at least two hydrogen substituted heteroatoms bonded to carbons of the respective component molecular fragment. The component molecular fragments of the organic additive compound are each reactive with acetaldehyde in a polyester to form water and a resulting organic molecular fragment comprising an unbridged five or six member ring including the at least two heteroatoms. Preferably, the organic additive compounds have at least twice the molecular weight of the component molecular fragments alone. The heteroatoms present in each molecular fragment capable of reacting with acetaldehyde include oxygen (O), nitrogen (N), and sulfur (S). The heteroatoms of the component molecular fragments suitably have at least one bond to an active hydrogen (H), and in the course of condensing with acetaldehyde should split off water. Preferred functional groups containing these heteroatoms include amine ($NH_2$ and NHR), hydroxyl (OH), carboxyl ($CO_2H$), amide ($CONH_2$ and CONHR), sulfonamide ($SO_2NH_2$), and thiol (SH). It is necessary for these functional groups to be sterically arranged so that on condensation with AA an unbridged 5 or 6 member ring can be formed. It is preferred that the structural arrangement allows the formation of a six membered ring. It is especially preferred that heteroatoms of the organic additive are attached to a preformed ring or rings. It is most preferred that the preformed ring(s) are aromatic so that the unbridged 5 or 6-member ring of the resulting organic compound is bonded to the aromatic ring. Suitable organic additive compounds may be substantially thermally stable at the temperatures required for melt-processing the polyester. It is also preferred that the functional groups present on the organic additive are relatively unreactive towards the ester linkages present in polyesters. Examples of preferred scavengers include 1,2-bis(2-aminobenzamidoyl)ethane; 1,2-bis(2-aminobenzamidoyl)propane; 1,3-bis(2-aminobenzamidoyl)propane; 1,3-bis(2-aminobenzamidoyl)pentane; 1,5-bis (2-aminobenzamidoyl)hexane; 1,6-bis(2-aminobenzamidoyl)hexane; and 1,2-bis(2-aminobenzamidoyl)cyclohexane. More preferred are scavengers where the component molecular fragments are derived from anthranilamide, because of their low cost, efficacy, and ease of incorporation into PET.

An especially preferred scavenger of said class is 1,6-bis (2-aminobenzamidoyl hexane).

Another group of acetaldehyde scavengers suitable for use in the present invention include Anthranilamide, 1,8-diaminonaphalene, Allantoin, 3,4-diaminobenzoic acid, Malonamide, Salicylanilide, 6-amino-1,3-dimethyluracil (DMU), 6-Aminoisocytosine, 6-Aminouracil, 6-Amino-1-methyluracil, α-tocopherol, triglycerin, trimethylolpropane, dipentaerythritol,tripentaerythritol,D-mannitol, D-sorbitol, and xylitol. From the aforementioned group, Anthranilamide, 1,8-diaminonaphalene, Allantoin, 3,4-diaminobenzoic acid, Malonamide, Salicylanilide, 6-amino-1,3-dimethyluracil (DMU), 6-Aminoisocytosine, 6-Aminouracil, 6-Amino-1-methyluracil are preferred.

In another embodiment, said acetaldehyde scavenger may comprise a hydroxylic compound selected from aliphatic hydroxylic compounds containing at least two hydroxyl groups, aliphatic-cycloaliphatic compounds containing at least two hydroxyl groups, and cycloaliphatic hydroroxylic compounds containing at least two hydroxyl groups.

The hydroxylic compounds preferably contain from 3 to about 8 hydroxy groups. They may contain one or more substituents, such as ether, carboxylic acid, carboxylic acid amide or carboxylic acid ester groups.

Preferred hydroxylic compounds include those having a pair of hydroxyl groups which are attached to respective carbon atoms which are separated one from another by at least one atom. Especially preferred hydroxylic compounds are those in which a pair of hydroxyl groups are attached to respective carbon atoms which are separated one from another by a single carbon atom.

As examples of suitable hydroxylic compounds there can be mentioned diols such as ethylene glycol, propane-1,2-diol, propane-1,3-diol, butane-1,4-diol, pentane-1,5-diol, hexane-1,2-diol, 2-methylpentane-2,4-diol, 2,5-dimethyl-hexane-2,5-diol, cyclohexane-1,2-diol, cyclohexane-1,1-dimethanol, diethylene glycol, triethylene glycol, and polyethylene glycols having, for example, a molecular weight from about 800 to about 2000, such as Carbowax™ 1000 which has a molecular weight of about 950 to about 1050 and contains from about 20 to about 24 ethyleneoxy groups per molecule; triols, such as glycerol, trimethylolpropane, 2,3-di-(2'-hydroxyethyl)-cyclohexan-1-ol, hexane-1,2,6-triol, 1,1,1-tris-(hydroxymethyl)ethane, 3-(2'-hydroxyethoxy)-propane-1,2-diol, 3-(2'-hydroxypropoxy)-propane-1,2-diol, 2-(2'-hydroxyethoxy)-hexane-1,2-diol, 6-(2'-hydroxypropoxy)-hexane-1,2-diol, 1,1,1-tris-[(2'-hydroxyethoxy)-methyl]-ethane, 1,1,1-tris-[(2'-hydroxypropoxy)-methyl]-propane, 1,1,1-tris-(4'-hydroxyphenyl)-ethane, 1,1,1,-tris-(hydroxyphenyl)-propane, 1,1,3-tris-(dihydroxy-3-methylphenyl)-propane, 1,1,4-tris-(dihydroxyphenyl)-butane, 1,1,5-tris-(hydroxyphenyl)-3-methylpentane, trimethylolpropane ethoxylates of the formula:

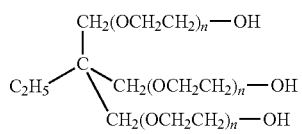

in which n is an integer, or trimethylolpropane propoxylates of the formula:

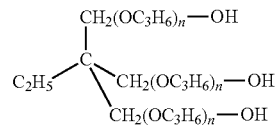

in which n is an integer, for example a trimethylolpropane propoxylate which has a molecular weight of about 1000; polyols such as pentaerythritol, dipentaerythritol, and tripentaerythritol; and saccharides, such as cyclodextrin, D-mannose, glucose, galactose, sucrose, fructose, xylose, arabinose, D-mannitol, D-sorbitol, D- or L-arabitol, xylitol, iditol, talitol, allitol, altritol, guilitol, erythritol, threitol, and D-gulonic-Y-lactone; and the like. Mixtures of two or more such compounds can be used. Especially preferred are aliphatic hydroxylic compounds which contain from 3 to about 8 hydroxy groups.

Said phosphorus additive may comprise a phosphorus atom in the trivalent or pentavalent state Said phosphorus additive may be obtained from acidic phosphorus compounds or their ester derivatives. The phosphorus additive may be obtained from compounds comprising phosphoric acid, phosphorous acid, polyphosphoric acid, carboxyphosphonic acids, phosphonic acid derivatives, and each of their acidic salts and acidic esters and derivatives. The phosphorus additive may comprise oligomeric phosphate tri-esters, (tris)ethylene glycol phosphate, tri-esters of phosphoric acid with ethylene glycol, diethylene glycol or mixtures of each.

Preferred phosphorus additives may be selected from phosphoric acid, phosphorus acid and their derivatives; and hypophosphite salts. Phosphoric acid is especially preferred.

Said polyester may comprise any grade suitable for making an article by any means.

Said polyester is preferably a polyethylene terephthalate which term, in the context of the present specification, is intended to encompass co-polyethylene terephthalates. Co-polyethylene terephthalates of polyethylene terephthalate may contain repeat units from at least 85 mole % terephthalic acid and at least 85 mole % of ethylene glycol. Dicarboxylic acids which can be included, along with terephthalic acid, are exemplified by phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid and sebacic acid. Other diols which may be incorporated in the co-polyethylene terephthalates, in addition to ethylene glycol, include diethylene glycol, triethylene glycol, 1,4-cyclohexanedimethanol, propane-1,3-diol, butane-1,4-diol, pentane-1,5-diol, hexane-1,6-diol, 3-methylpentane-2,4-diol, 2-methyl pentane-1,4-diol, 2,2,4-trimethylpentane-1,3-diol, 2-ethylhexane-1,3-diol, 2,2-diethylpropane-1,3-diol, hexane-1,3-diol, 1,4-di(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. In a preferred embodiment said polyethylene terephthalate has less than 10 mole %, more preferably less than 6 mole % especially less than 2 mole % comonomer substitution. Preferably, said co-polyethylene terephthalate does not comprise co-polyethylene terephthalate; it suitably comprises substantially a homopolymer produced by esterification or transesterification of terephthalic acid or dimethyl terephthalate and ethylene glycol to produce bis(2-hydroxyethyl) terephthalate which is then subjected to polycondensation at high temperatures in vacuum in the presence of a catalyst.

As used herein the term "IV" refers to the Inherent Viscosity of the polymer, as determined on a solution of 0.5 g of polymer dissolved in 100 ml of a mixture of phenol (60% by volume) and tetrachloroethane (40% by volume).

The IV of the polyester at the time of contact with said acetaldehyde scavenger and said phosphorus additive is preferably greater than 0.5 dL/g, more preferably greater than 0.65 dL/g The polyester may be specifically adapted for use in extrusion blow moulding (EBM). Such adaptations are know to those skilled in the art and include increasing the amount of co-monomers, altering IV and structure.

Said polyester is suitably not prepared using an antimony-based catalyst. Thus, said polyester suitably includes less than about 100 ppm of antimony moieties, typically less than about 75 ppm of antimony moieties, and more typically less than about 50 ppm of antimony moieties. Preferably the polyester includes less than 25 ppm of antimony moieties and more preferably less than about 10 ppm of antimony moieties. In many instances, the polyester may be essentially free of antimony moieties.

Said polyester is suitably not prepared using a germanium-based catalyst. Thus, said polyester suitably includes less than about 100 ppm of germanium moieties, typically less than about 75 ppm of germanium moieties, and more typically less than about 50 ppm of germanium moieties. Preferably the polyester includes less than 25 ppm of germanium moieties and more preferably less than about 10 ppm of germanium moieties. In many instances, the polyester may be essentially free of germanium moieties.

Said polyester may be prepared using a titanium-based or aluminium-based catalyst. As a result, the polyester may include residual titanium or aluminium moieties.

The polyester may include at least 2 ppm, or at least 5 ppm of titanium moieties. The polyester may include between about 2 ppm and 50 ppm of titanium moieties. Preferably, the polyester includes less than 25 ppm of titanium moieties (e.g., between about 2 and 20 ppm). More preferably, the polyester includes at least about 5 ppm of titanium moieties or less than about 15 ppm of titanium moieties.

The polyester may include at least 2 ppm, or at least 5 ppm of aluminium moieties. The polyester may include less than 150 ppm or less than 100 ppm aluminium moieties. The polyester may include between about 2 ppm and 50 ppm of aluminium moieties. Preferably, the polyester includes less than 25 ppm of aluminium moieties (e.g., between about 2 and 20 ppm). More preferably, the polyester includes at least about 5 ppm of aluminium moieties or less than about 15 ppm of aluminium moieties.

The titanium catalyst used in the preparation of the polyester may typically be a titanate, such as titanium diisopropoxide bis(acetyl-acetonate) or tetrabutyl titanate as described in US2005/0153086 and the patent applications referred to therein.

Aluminium based catalysts for preparing polyester may be selected from not only metal aluminium but also known aluminium compounds.

Specifically, the aluminium compounds include carboxylates such as aluminium formate, aluminium acetate, basic aluminium acetate, aluminium propionate, aluminium oxalate, aluminium acrylate, aluminium laurate, aluminium stearate, aluminium benzoate, aluminium trichloroacetate, aluminium lactate, aluminium citrate and aluminium salicylate, inorganic acid salts such as aluminium chloride, aluminium hydroxide, aluminium hydroxide chloride, aluminium carbonate, aluminium phosphate and aluminium phosphonate, aluminium alkoxides such as aluminium methoxide, aluminium ethoxide, aluminium n-propoxide, aluminium iso-propoxide, aluminium n-butoxide and aluminium t-butoxide, aluminium chelate compounds such as aluminium acetylacetonate, aluminium acetylacetate, aluminium ethylacetoacetate, aluminium ethylacetoacetate di-iso-propoxide, organo aluminium compounds such as trimethyl aluminium and triethyl aluminium, and partial hydrolyzates thereof and aluminium oxides. Among these, the carboxylates, inorganic acid salts and chelate compounds are preferable, among which aluminium acetate, aluminium chloride, aluminium hydroxide, aluminium hydroxide chloride and aluminium acetylacetonate are particularly preferable.

In one embodiment, the polyester, especially polyethylene terephthalate, is prepared using an aluminium based catalyst and therefore suitably includes residual aluminium.

In a preferred embodiment, said polyester comprises the following after step (c): polyethylene terephthalate having less than 25 ppm antimony moieties, less than 25 ppm germanium moieties, at least 5 ppm of a catalytic residue selected from a titanium-based or aluminium-based catalyst, an acetaldehyde scavenger which comprises anthranilamide and a phosphorus additive selected from phosphoric acid, phosphorous acid and their derivatives; and hypophosphite salts. In said preferred embodiment, 5 to 500 ppm (suitably 10 to 400 ppm, preferably 20 to 300 ppm) of anthranilamide and 5 to 500 ppm (suitably 5 to 200 ppm, preferably 10 to 200 ppm, more preferably 15 to 150 ppm) of phosphorus additive is contacted with said polyethylene terephthalate in step (c) of the method and such additives suitably are present in the polyester after step (c).

The invention extends to a method of making a shaped article from a polyester, the method comprising
(a) selecting an acetaldehyde scavenger;
(b) selecting a phosphorus additive, being an additive comprising a phosphorus moiety;
(c) contacting the polyester with said acetaldehyde scavenger and with said phosphorus additive; and
(d) forming said polyester into a shaped article.

Preferably, step (c) is carried out with the polyester not in a fluid, for example molten state. Thereafter, in step (d), the polyester is suitably melt-processed to define said shaped article.

Said shaped article may be defined by any process known in the art. For example, injection molding may be used to form preforms used to blow bottles, food/beverage containers, trays, or other desirable shapes. Also the polymer melts may be used in extrusion blow molding operations to provide bottles, food containers, and the like. The polymer melt may similarly be fed to an extruder to produce films, sheet, profiles, pipe and the like.

Preferably, said shaped article comprises a container or preform for a container. More preferably, said shaped article comprises a preform, for example for a bottle, such as a beverage bottle.

The invention extends to a method of the first aspect wherein step (a) is optional as is contact with a said acetaldehyde scavenger in step (c).

In an embodiment, wherein step (a) is optional, said method may comprise selecting a polyethylene terephthalate in a solid state which includes less than 25 ppm (or less than 10 ppm) of antimony moieties, less than 25 ppm (or less than 10 ppm germanium moieties), at least 5 ppm of a catalytic residue selected from titanium-based or aluminium-based catalysts and contacting the polyethylene terephthalate in said solid state with a said phosphorus additive; and optionally melt-processing a mixture of the polyethylene terephthalate and phosphorus additive to make a shaped article.

According to a second aspect of the invention, there is provided a polyester having a reduced level of acetaldehyde, said polyester incorporating a phosphorus additive and an acetaldehyde scavenger as described herein.

Said polyester may be in the form of a shaped article, for example a preform for a bottle or a bottle.

According to a third aspect of the invention, there is provided a formulation comprising a phosphorus additive and an acetaldehyde scavenger as described herein.

The sum of the wt % of acetaldehyde scavenger(s) and phosphorus additive(s) in said formulation may be less than 60% wt %, preferably less than 50 wt %. Said sum may be at least 3 wt %, preferably at least 5 wt %, more preferably at least 7 wt %. Said sum may be in the range 10-50 wt %.

Any feature of any aspect of any invention, or embodiment described herein may be combined with any feature of any aspect of any other invention or embodiment described herein mutatis mutandis.

Specific embodiments of the invention will now be described, by way of example.

EXAMPLE 1

Preparation of Additives

Anthranilamide was prepared as a 41% dispersion of Anthranilamide in a carrier. The dispersion is available from Colormatrix Europe under product code 280-6015-10 or can be made by standard techniques.

Phosphorus additives were used in solid form or dispersed in an inert carrier.

EXAMPLE 2

General Procedure for Preparation of Preforms

Selected aluminium and titanium catalysed PET resins were dried prior to use using Con-Air (Trade Mark) dryers for at least four hours at 160° C.

Prior to injection moulding, any anthranilamide (as a dispersion) and phosphorus (as a solid or as a dispersion) additives were added to hot dry PET pellets and tumble mixed to ensure good dispersion of the additives Bottle preforms were produced on a Husky GL 160 injection moulding machine which was fitted with a 35 g, 1 liter preform tool. The machine was operated under standard operating conditions as retained in the machine memory.

EXAMPLE 3

General Procedure for Determining Acetaldehyde Content of Preform Samples

The acetaldehyde content of samples was determined on preform samples that had been cryo-ground to less than 1 mm. The level of acetaldehyde was determined using an Agilent 6890N gas chromatograph with a headspace sample changer and FID detector. Acetaldehyde reductions were calculated on the basis of percentage reduction seen in the acetaldehyde levels of a preform with additives, to that with no additives.

Colour measurements were conducted on preform samples using a Minolta CM-3700d spectrophotometer in transmission mode filled with a D65/10° light source.

Results

Table 1 shows the acetaldehyde reductions for anthranilamide and anthranilamide/phosphorous acid combinations when used with an aluminium catalysed PET. The results show that combining anthranilamide with phosphorous acid allows for a substantial reduction in the amount of anthranilamide for a given level of acetaldehyde reduction. In table 1, entry 3 has a greater reduction in acetaldehyde than entry 4 even though it has a much lower concentration of anthranilamide. This lowers the amount of additive added to the polymer thus improving the aesthetics of the final article. In addition, anthranilamide is prone to sublimation and deposits on the moulding machinery. This requires down time to clean, so once again anything that can maintain a desired level of acetaldehyde reduction whilst reducing the level of anthranilamide is desired.

TABLE 1

| Entry | Anthranilamide Loading (ppm) | Phosphorous Acid (ppm) | AA reduction (%) |
|---|---|---|---|
| 1 | — | — | — |
| 2 | 100 | 0 | 47 |
| 3 | 100 | 50 | 69 |
| 4 | 250 | 0 | 58 |
| 5 | 250 | 50 | 71 |

Table 2 shows the acetaldehyde reductions for anthranilamide and anthranilamide/phosphoric acid combinations when used with a titanium catalysed PET. The results show that adding the combination of anthranilamide and phosphorus containing compounds to the resin during the moulding process gives substantial acetaldehyde reductions.

The results show that combining anthranilamide with phosphoric acid allows for a substantial reduction in the amount of anthranilamide for a given level of acetaldehyde reduction. In table 2, entry 3 has a greater reduction in acetaldehyde than entry 6 even though it has a much lower concentration of anthranilamide (five times as much). This lowers the amount of additive added to the polymer thus improving the aesthetics of the final article.

TABLE 2

| Entry | Anthranilamide Loading (ppm) | Phosphoric Acid (ppm) | AA reduction (%) |
|---|---|---|---|
| 1 | — | — | — |
| 2 | 100 | 0 | 11 |
| 3 | 100 | 50 | 56 |
| 4 | 250 | 0 | 24 |
| 5 | 250 | 50 | 61 |
| 6 | 500 | 0 | 46 |
| 7 | 500 | 50 | 68 |

The invention claimed is:

1. A method of reducing acetaldehyde production in a polyester, the method comprising:
   (a) selecting a polyester which includes less than 25 ppm antimony moieties;
   (b) selecting an acetaldehyde scavenger which includes an amine moiety, an amide moiety, and a substituted phenyl moiety;
   (c) selecting a phosphorus additive, said additive being selected from the group consisting of phosphoric acid, phosphorous acid, polyphosphonic acid, carboxyphosphoric acids, phosphoric acid derivatives, acid salts and acidic esters of the aforesaid, and hypophosphite salts; and (d) contacting the polyester which has an IV of greater than 0.5 dL/g with said acetaldehyde scavenger and with said phosphorus additive.

2. A method according to claim 1, wherein in step (d), polyester is contacted with at least 5 ppm and less than 1000 ppm of acetaldehyde scavenger per part of polyester; and is contacted with at least 15 ppm and less than 500 ppm of phosphorus additive per part of polyester.

3. A method according to claim 1, wherein the ratio of the ppm of said selected acetaldehyde scavenger to the ppm of said selected phosphorus additive is in the range 0.5 to 25.

4. A method according to claim 1, wherein the ratio of the ppm of said selected acetaldehyde scavenger to the ppm of said selected phosphorus additive is in the range 1 to 5000.

5. A method according to claim 1, wherein a mixture comprising said acetaldehyde scavenger, said phosphorus additive and a polyester compatible organic liquid carrier is selected prior to step (d) and the mixture is contacted with the polyester in step (d).

6. A method according to claim 1, wherein said acetaldehyde scavenger is selected from the group consisting of:
1,2-bis(2-aminobenzamidoyl)ethane; 1,2-bis(2aminobenzamidoyl)propane; 1,3-bis(2-aminobenzamidoyl)propane; 1,3-bis(2-aminobenzamidoyl)pentane; 1,5-bis(2-aminobenzamidoyl)hexane; 1,6-bis(2-aminobenzamidoyl)hexane; 1,2-bis(2-aminobenzamidoyl)cyclohexane; and scavengers which include component molecular fragments derived from anthranilamide.

7. A method according to claim 1, wherein said phosphorus additive is selected from the group consisting of: phosphoric acid, phosphorous acid, and hypophosphite salts.

8. A method according to claim 1, wherein said phosphorus additive is phosphoric acid.

9. A method according to claim 1, wherein said polyester includes less than 25 ppm of germanium moieties.

10. A method according to claim 1, wherein said polyester includes at least 2 ppm of titanium moieties; and less than 25 ppm of titanium moieties.

11. A method according to claim 1, wherein said polyester includes at least 2 ppm of aluminium moieties; and less than 150 ppm of aluminium moieties.

12. A method of reducing acetaldehyde production in a polyester, the method comprising:
(a) selecting an acetaldehyde scavenger which includes an amine moiety, an amide moiety, and a substituted phenyl moiety;
(b) selecting a phosphorus additive, being an additive comprising a phosphorus moiety; and
(c) contacting the polyester which has an IV of greater than 0.5 with said acetaldehyde scavenger and with said phosphorus additive;
wherein said polyester comprises the following after step (c): polyethylene terephthalate having less than 25 ppm antimony moieties, less than 25 ppm germanium moieties, at least 5 ppm of a catalytic residue selected from a titanium-based or aluminium-based catalyst, an acetaldehyde scavenger which comprises anthranilamide and a phosphorus additive selected from the group consisting of phosphoric acid, phosphorous acid, and hypophosphite salts.

13. A method according to claim 1, which comprises forming said polyester into a container or preform for a container, after step (d).

14. A method according to claim 1, wherein said phosphorous additive is selected from the group consisting of phosphoric acid, phosphorous acid, and hypophosphite salts.

15. A method according to claim 1, wherein said acetaldehyde scavenger comprises anthranilamide.

16. A method according to claim 15, wherein said phosphorous additive is phosphoric acid.

17. A method of reducing acetaldehyde production in a polyester, the method comprising:
(a) selecting an acetaldehyde scavenger which includes an amine moiety, an amide moiety, and a substituted phenyl moiety;
(b) selecting a phosphorus additive, being an additive comprising a phosphorus moiety; and
(c) contacting the polyester which has an IV of greater than 0.5 dL/g with said acetaldehyde scavenger and with said phosphorus additive;
wherein, after step (c), there is provided polyethylene terephthalate having less than 25 ppm antimony moieties, less than 25 ppm germanium moieties, at least 5 ppm of a catalytic residue selected from a titanium-based or aluminium-based catalyst, an acetaldehyde scavenger which comprises anthranilamide and a phosphorus additive selected from the group consisting of phosphoric acid, phosphorous acid, and hypophosphite salts.

18. A method according to claim 1, wherein step (d) comprises contacting the polyester with a liquid formulation comprising said phosphorous additive and said acetaldehyde scavenger, wherein the sum of the wt % of acetaldehyde scavenger and phosphorus additive in said formulation is less than 60% wt % and said sum is at least 3 wt %, wherein said acetaldehyde scavenger is anthranilamide and said phosphorous additive is phosphoric acid.

19. A method according to claim 1, wherein the polyester contacted with said acetaldehyde scavenger and phosphorous additive in step (d) is a solid polyester which is present substantially in the absence of monomers used in preparation of the polyester.

20. A method of reducing acetaldehyde production in a polyester, the method comprising:
(a) selecting a polyester which includes less than 25 ppm of antimony moieties and less than 100 ppm of germanium moieties, less than 25 ppm of titanium moieties; and less than 150 ppm of aluminium moieties;
(b) selecting an acetaldehyde scavenger which comprises anthranilamide;
(c) selecting a phosphorus additive which is phosphoric acid;
(d) contacting the polyester which has an IV of greater than 0.5 dL/g with said acetaldehyde scavenger and with said phosphorus additive, wherein:
(i) in step (d), polyester is contacted with at least 5 ppm and less than 1000 ppm of acetaldehyde scavenger per part of polyester; and is contacted with at least 15ppm and less than 500ppm of phosphorus additive per part of polyester; and
(ii) the ratio of the ppm of said selected acetaldehyde scavenger to the ppm of said selected phosphorus additive is in the range 0.5 to 25; and
(iii) the ratio of the ppm of said selected acetaldehyde scavenger to the ppm of said selected phosphorus additive is in the range 1 to 5000; and
(iv) a mixture comprising said acetaldehyde scavenger, said phosphorus additive and a polyester compatible organic liquid carrier is selected prior to step (c) and the mixture is contacted with the polyester in step (c);

(e) forming said polyester into a container or preform for a container, after step (d).

21. A method according to claim 12, wherein said acetaldehyde scavenger comprises anthranilamide.

22. A method according to claim 17, wherein said acetaldehyde scavenger comprises anthranilamide.

* * * * *